United States Patent
Kondo et al.

(10) Patent No.: US 8,305,679 B2
(45) Date of Patent: *Nov. 6, 2012

(54) ELECTROMAGNETIC WAVE OSCILLATING DEVICES

(75) Inventors: Jungo Kondo, Miyoshi (JP); Kenji Aoki, Nagoya (JP); Yuichi Iwata, Nagoya (JP); Tetsuya Ejiri, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 156 days.

This patent is subject to a terminal disclaimer.

(21) Appl. No.: 12/851,577

(22) Filed: Aug. 6, 2010

(65) Prior Publication Data

US 2011/0032599 A1 Feb. 10, 2011

(30) Foreign Application Priority Data

Aug. 10, 2009 (JP) ................. 2009-185768

(51) Int. Cl.
*G02F 1/35* (2006.01)
(52) U.S. Cl. ......... 359/326; 359/328; 359/332; 385/122
(58) Field of Classification Search ........... 359/330–332
See application file for complete search history.

(56) References Cited

U.S. PATENT DOCUMENTS

| | | | |
|---|---|---|---|
| 5,151,965 A | 9/1992 | Rikken et al. | |
| 6,903,341 B2 | 6/2005 | Imai et al. | |
| 7,372,621 B2 * | 5/2008 | Yoshino et al. | 359/326 |
| 7,589,886 B1 * | 9/2009 | Chen et al. | 359/332 |
| 7,626,756 B2 | 12/2009 | Dunn et al. | |
| 2002/0024718 A1 | 2/2002 | Kawase et al. | |
| 2008/0298757 A1 * | 12/2008 | Dunn et al. | 385/122 |
| 2010/0290487 A1 * | 11/2010 | Wu | 372/21 |

FOREIGN PATENT DOCUMENTS

| | | |
|---|---|---|
| JP | 09-146131 A1 | 6/1997 |
| JP | 2002-072269 A1 | 3/2002 |

OTHER PUBLICATIONS

U.S. Appl. No. 12/851,579, filed Aug. 6, 2010, Kondo et al.
U.S. Appl. No. 12/851,580, filed Aug. 6, 2010, Kondo et al.
Jun-ich Nishizawa, "Basis and Applications of Terahertz Wave," Kogyo Chosa Kai, 2005, pp. 105-115.
K. Kawase et al., "Coherent Tunable THz-Wave Generation from $LiNbO_3$ with Monolithic Grating Coupler," Appl. Phys. Lett., vol. 68, No. 18, Apr. 29, 1996, pp. 2483-2485.
Takayuki Shibuya, et al., "Cherenkov-Type Phase-Matched Widely Tunable THz-Wave Generation Using Lithium Niobate Waveguide," The 56th Applied Physics Related Association Conference, Proceedings, 2009 Spring, Tsukuba University, 39p-P1-3.
U.S. Office Action dated Jul. 12, 2012.

* cited by examiner

*Primary Examiner* — Hemang Sanghavi
(74) *Attorney, Agent, or Firm* — Burr & Brown (57) ABSTRACT

A device for oscillating an electromagnetic wave having a frequency of 0.1 THz to 3 THz from pump and idler waves by a parametric effect. The device includes a supporting body, an oscillating substrate made of a non-linear optical crystal, and an adhesive layer adhering the supporting body and oscillating substrate. The oscillating substrate includes an upper face, a bottom face and an incident face on which the pump wave is made incident. The oscillating substrate provides cut-off with respect to the electromagnetic wave oscillated by the parametric effect when the pump and idler waves propagate in parallel with the bottom face.

5 Claims, 7 Drawing Sheets

Parametric Wave oscillating condition
(Cherenkov Radiation)

Angle of Incidence $\alpha = 0.06°$ $\theta = 64.8°$   0.14 THz

Fig. 7

Calculating condition: n2、n3 are sufficiently thick

ELECTROMAGNETIC WAVE OSCILLATING DEVICES

This application claims the benefit of Japanese Patent Application P2009-185768 filed on Aug. 10, 2009, the entirety of which is incorporated by reference.

FIELD OF THE INVENTION

The present invention relates to a device of oscillating so-called terahertz wave.

BACKGROUND OF THE INVENTION

Terahertz waves are electromagnetic waves generally having a frequency of 0.1 THz to 10 THz, and are expected for basic fields such as physical properties, electrospectroscopy, bioscience, chemistry and pharmaceutical science and for applied fields of atmospheric environmental assessment, security, material test, food test and communication.

As a device for oscillating terahertz waves, it has been developed a backward wave oscillator (BOW) and photomixing in several hundreds GHz band and free electron energy laser, p-Ge laser and quantum cascade laser (QCL) for 1 THz or more. These devices, however, have problems in the miniaturization and improvement of output power.

On the other hand, it has been recently developed a device for oscillating a wide-band terahertz wave with an optical switch or rectification using a femtosecond laser as a light source and applied for time domain spectroscopy (TDS) or the like.

In addition to this, for generating terahertz wave using a non-linear optical crystal such as $LiNbO_3$, it has been known methods of utilizing quasi phase matching and of utilizing phonon polariton. Such methods are expected for applications requiring sources generating the terahertz wave having high temporal and spatial coherency.

According to "Basis and applications of terahertz wave" published by Kogyo Chosa Kai, 2005 and authored by Junich NISHIZAWA, pages 105 to 115, stimulated Raman scattering (referred to as Polariton stimulated scattering) is caused by Polariton, which is hybrid wave of optically active transverse wave lattice vibration (TO Phonon) and terahertz wave in a crystal. It is thereby strongly generated parametric interactions of three kinds of waves, which are pump wave, idler wave and terahertz wave. As a result, when the pump wave exceeds a predetermined threshold value, idler and terahertz waves having coherency comparable with that of the pump wave are to be oscillated. Polariton stimulated scattering is observed in polar crystals such as $LiNbO_3$, $LiTaO_3$, GaP or the like. $LiNbO_3$ has properties that (1) it is transparent in light wave region in a wide band (0.4 nm to 5.5 μm) and (2) resistive against optical damage, so that terahertz wave can be oscillated at a high output power.

Figure 1:
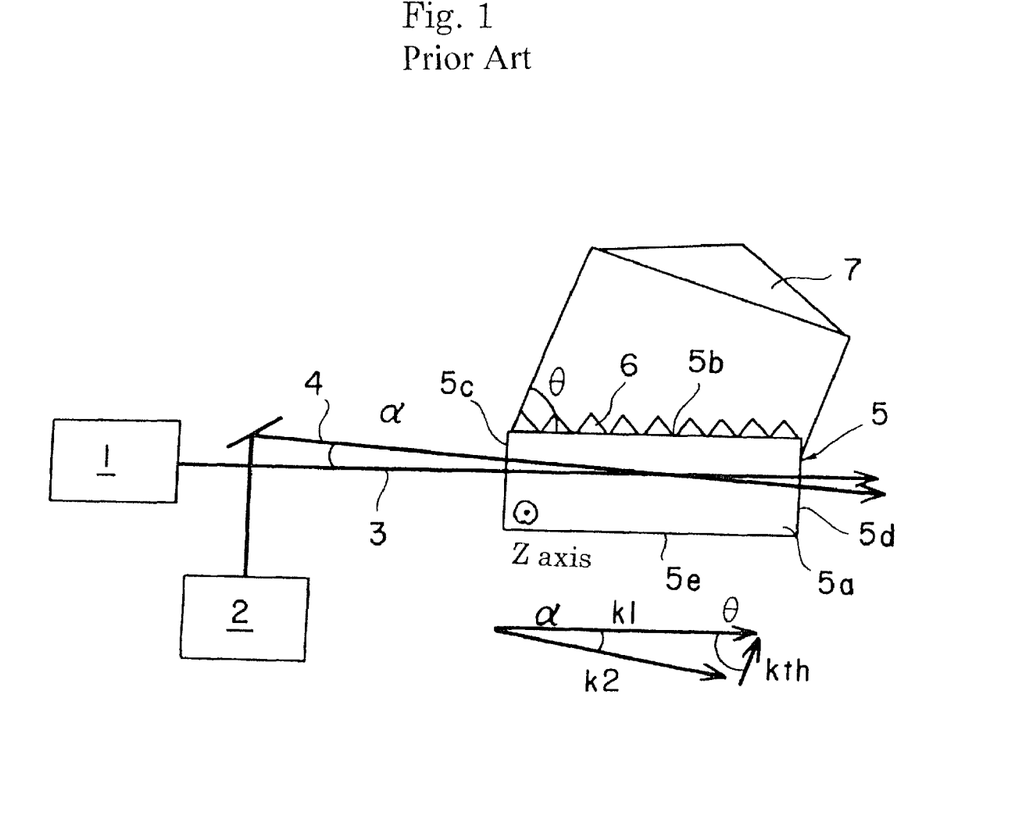
FIG. 1 is a schematic view illustrating an example of an oscillating device according to prior art.

Japanese Patent Publication No. H09-146131A discloses a device of oscillating terahertz wave using a y-plate or z-plate of $LiNbO_3$. The principle of oscillation of terahertz wave will be described referring to FIG. 1. FIG. 1 shows a main face 5a of a substrate 5 of the z-plate of $LiNbO_3$ viewed from the above. The substrate 5 includes an incident face 5c of pump wave, an emitting face 5d of the pump wave, and side faces 5b and 5e. For example, a light source 1 irradiates the pump wave 3 and a light source 2 irradiates an idler wave 4 onto the substrate. The pump wave 3 (frequency ω1), idler wave (frequency ω2) and polariton (terahertz wave: frequency ωT) satisfy law of conservation of energy (ω1=ω2+ωT) and law of conservation of momentum (noncollinear phase matching condition: k1=k2+kth), so that polariton stimulated scattering is observed. In this case, due to the scattering property, the frequencies of the idler wave 4 and terahertz wave 7 are decided depending on the angles α and θ of the pump wave 3 with respect to the optical axis.

According to the method, typically, the phase matching condition is satisfied when an angle α of wave vector k1 of the pump wave 3 and wave vector k2 of the idler wave is 0.5° to 1° and the terahertz wave 7 was oscillated (wavelength of 100 to 300 μm, frequency of 3 THz to 1 THz) at a high efficiency. Further, it is described that the terahertz wave is oscillated at an angle of 65 to 66° with respect to the idler wave. In the case that a y-plate is used, the crystal orientation is different from that of the z-plate. Therefore, the pump wave 3 and idler wave 4 propagate on a plane perpendicular to the substrate in an angle α to generate terahertz wave at an angle θ with respect to the pump wave.

However, (1) the crystal has a refractive index as high as 5.2 with respect to sub-milli wave (terahertz wave) so that total internal reflection occurs between the crystal and air. It is thus impossible to draw the terahertz wave into the air both in the cases of the y-plate and z-plate. (2) Optical loss in the crystal is large. For example, the optical intensity of the terahertz wave is reduced to about 0.1 percent with respect to a propagation distance of 3 mm of the terahertz wave. For these problems, according to Japanese Patent Publication No. H09-146131A, a grating 6 is provided on a side face 5b of the substrate 5 to enable the emitting of the terahertz wave into the air at a high efficiency.

Further, according to K. Kawase, M. Sato, T. Taniuchi, and H. Ito, (Appl. Phys. Lett.,) 68, PP. 2483 to 2485, 1996, it is described that the intensity of the idler wave as well as that of the terahertz wave can be improved by constituting a resonator with the idler wave (terahertz wave parametric oscillation: TPO). In this case, by changing the angle α in a range of 1 to 2°, the terahertz wave of 0.97 THz to 2.2 THz can be oscillated. A y-plate of $LiNbO_3$: crystal is used and silicon prism is pressed on a surface of the crystal so that (1) the terahertz wave can be drawn to the air at a high efficiency, (2) the fluctuation of the outgoing angle can be reduced (low dependency on wavelength) and (3) the terahertz wave having high directivity can be oscillated.

According to the method, however, the terahertz wave is considerably attenuated during the propagation near the crystal surface. Further, the process of fixing the silicon prism on the crystal surface is difficult to perform and requires a high cost.

According to Japanese Patent Publication No. 2002-72269A, an exciting laser light having a single frequency is irradiated and an idler wave having a single frequency is used for optical injection to generate terahertz wave having a high output power and whose spectrum line width can be reduced. A silicon prism is, however, used for drawing the terahertz wave.

Figure 2:
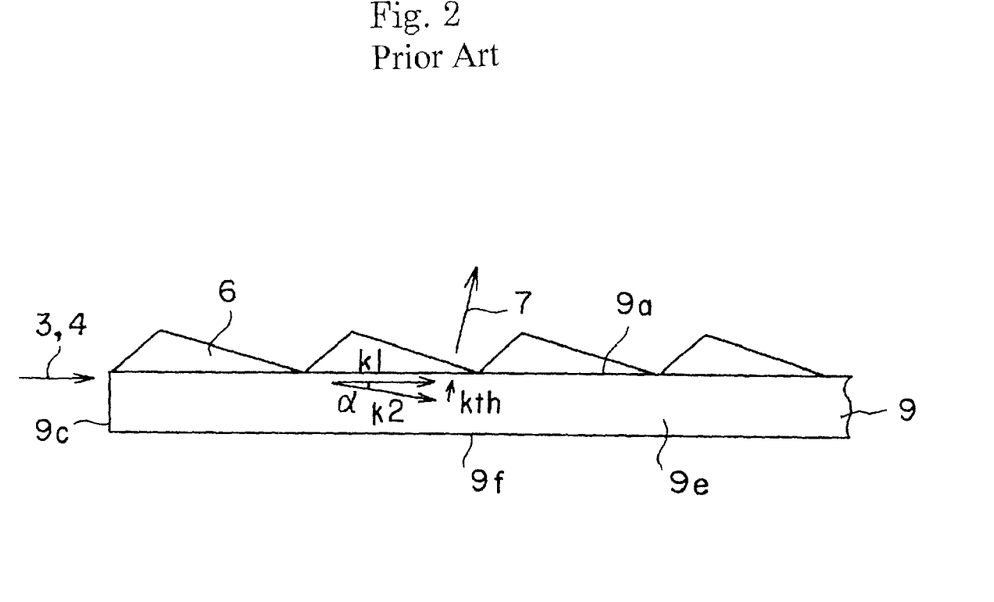
FIG. 2 is a schematic view illustrating an example of an oscillating device according to prior art.

According to "Cherenkov-type phase-matched widely tunable THz-Wave generation using lithium niobate waveguide" (the 56'th Applied Physics Related Association Conference, Proceedings, 2009 spring, Tsukuba University, 30 p-P1-3), a slab optical waveguide of a y-plate or a z-plate of lithium niobate is applied to wide-band tuning of terahertz wave light source. It will be described referring to FIG. 2. A pump wave 3 and idler wave 4 are made incident onto an incident face 9c of an optical waveguide of a substrate 9, which is composed of a y-plate made of lithium niobate doped with magnesium oxide. 9a represents an upper face, 9f represents a bottom face and 9e represents a side face. Although it is described that the thickness of the slab optical waveguide is 3.8 μm, the detail is not described. According to the method, (1) the thickness of the slab optical waveguide 9 is made 3.8 μm to confine the exciting light in the slab optical waveguide 9 to reduce the phase mismatch, (2) the thickness of the substrate 9 is lowered to oscillate the terahertz wave from the crystal surface and to avoid the absorption of the terahertz wave 7 into the crystal, and (3) a prism 6 is provided on the upper face 1a of the substrate 1 to draw the terahertz wave 7.

SUMMARY OF THE INVENTION

As described above, according to prior devices, when the terahertz wave is oscillated by parametric effect, most of the wave is absorbed to the inside of the crystal. Further, as the refractive index of the crystal is considerably larger than that of air, it is impossible to draw the terahertz wave to the outside without providing a prism or grating on the crystal surface. The intensity of the terahertz wave oscillated from the device is too low to be applied in a practical view, and the process of providing the prism or grating on the crystal surface is indispensable. Further, the prism or grating on the crystal surface results in a propagation loss and reflection loss.

An object of the present invention is to confine pump and idler waves in a slab optical waveguide, to generate a terahertz wave by parametric oscillation at a high efficiency, to improve the intensity of the terahertz wave drawn to the outside of a crystal and avoid the necessity of providing an optical drawing means, such as a prism or grating, onto the crystal surface.

The present invention provides a device of oscillating an electromagnetic wave having a frequency of 0.1 THz to 3 THz from pump and idler waves by parametric effect, the device comprising:

a supporting body:

an oscillating substrate comprising a z-plate of a non-linear optical crystal, the oscillating substrate comprising an upper face, a bottom face and an incident face on which the pump wave is made incident; and an adhesive layer adhering the supporting body and the oscillating substrate, the adhesive layer having a refractive index with respect to the pump wave lower than that of the oscillating substrate;

wherein the oscillating substrate is cut-off with respect to the electromagnetic wave oscillated by parametric effect when the pump and idler waves propagate in parallel with the bottom face.

According to the present invention, the oscillating substrate of a z-plate of a non-linear optical crystal is adhered onto the supporting body. In the case that the oscillating substrate of a z-plate is used, for oscillating the terahertz wave by parametric effect, polarized waves vibrating in the direction of the substrate thickness are input as the pump and idler waves, which propagate in parallel with the bottom face of the substrate. The electromagnetic wave (terahertz wave) is oscillated by parametric effect also as polarized wave vibrating in the direction of thickness of the substrate, and propagates in parallel with the bottom face of the substrate. At this stage, it is considered that the thickness of the substrate is selected to provide cut-off state with respect to the oscillated electromagnetic wave.

As a result, the terahertz wave oscillated by parametric effect in the substrate can be drawn to the outside of the crystal without reducing the intensity. Further, it is not necessary to provide an optical means, such as a prism, grating or the like, for drawing the terahertz wave on the crystal surface.

According to the device shown in FIG. 1, the attenuation of the terahertz wave within the substrate cannot be prevented and the provision of the prism or the like on the emitting face 5b is indispensable.

According to the device of "Cherenkov-type phase-matched widely tunable THz-Wave generation using lithium niobate waveguide" (the 56'th Applied Physics Related Association Conference, Proceedings, 2009 spring, Tsukuba University, 30 p-P1-3), the y-plate or z-plate is used and the terahertz wave is thus generated in the direction toward the crystal surface. In this case, if the thickness of the substrate would be large, the propagation loss inside of the substrate surface should have been problematic so that the terahertz wave of a large output power could have not been drawn to the outside of the substrate. Then, the thickness of the substrate is lowered to reduce the propagation length and absorption loss. Further, the silicon prism is pressed onto the substrate surface to draw the terahertz wave to the outside of the substrate at a high efficiency. Therefore, the substrate is not made cut-off with respect to the terahertz wave.

If the oscillating substrate would have been made cut-off with respect to the terahertz wave, the terahertz wave should have been radiated in a predetermined direction to the outside of the oscillating substrate and it should have been unnecessary to provide the silicon prism. Further, if the oscillating substrate would have been made cut-off with respect to the terahertz wave, the terahertz wave should have not been absorbed to result in a loss during the propagation within the oscillating substrate. Therefore, it should have been unnecessary to lower the thickness of the oscillating substrate to 3.8 μm for preventing the absorption of the terahertz wave within the substrate.

According to the structure of the present invention, the z-plate is used and the thickness of the substrate is lowered, so that it is made cut-off with respect to the terahertz wave. It is thus possible to draw the terahertz wave to the outside of the substrate without providing a prism of a high refractive index material, such as silicon, on the upper and lower clads of the substrate.

According to the structure of the present invention, it is not necessary to provide such silicon prism, so that the refractive index of the clad with respect to the pump wave can be made smaller than that of the LN substrate. It is thus possible to sufficiently confine the exciting light to increase the optical intensity and to generate the terahertz wave having a higher output power.

BRIEF DESCRIPTION OF THE DRAWINGS

FIGS. 5 (a) and 5 (b) are side views showing the oscillating device of FIGS. 3 and 4, respectively.

DETAILED DESCRIPTION OF THE INVENTION

The present invention provides a device of oscillating an electromagnetic wave having a frequency of 0.1 THz to 3 THz from pump and idler waves by parametric effect.

That is, the pump wave is made incident into an oscillating substrate made of a non-linear optical crystal capable of parametric oscillation, so that the idler and terahertz waves are generated in directions satisfying noncollinear phase matching condition. At this stage, a first laser light having a single frequency as the pump wave may preferably be used and a separate second laser light having a single frequency may preferably be injected in the direction of the generation of the idler wave.

Figure 3:
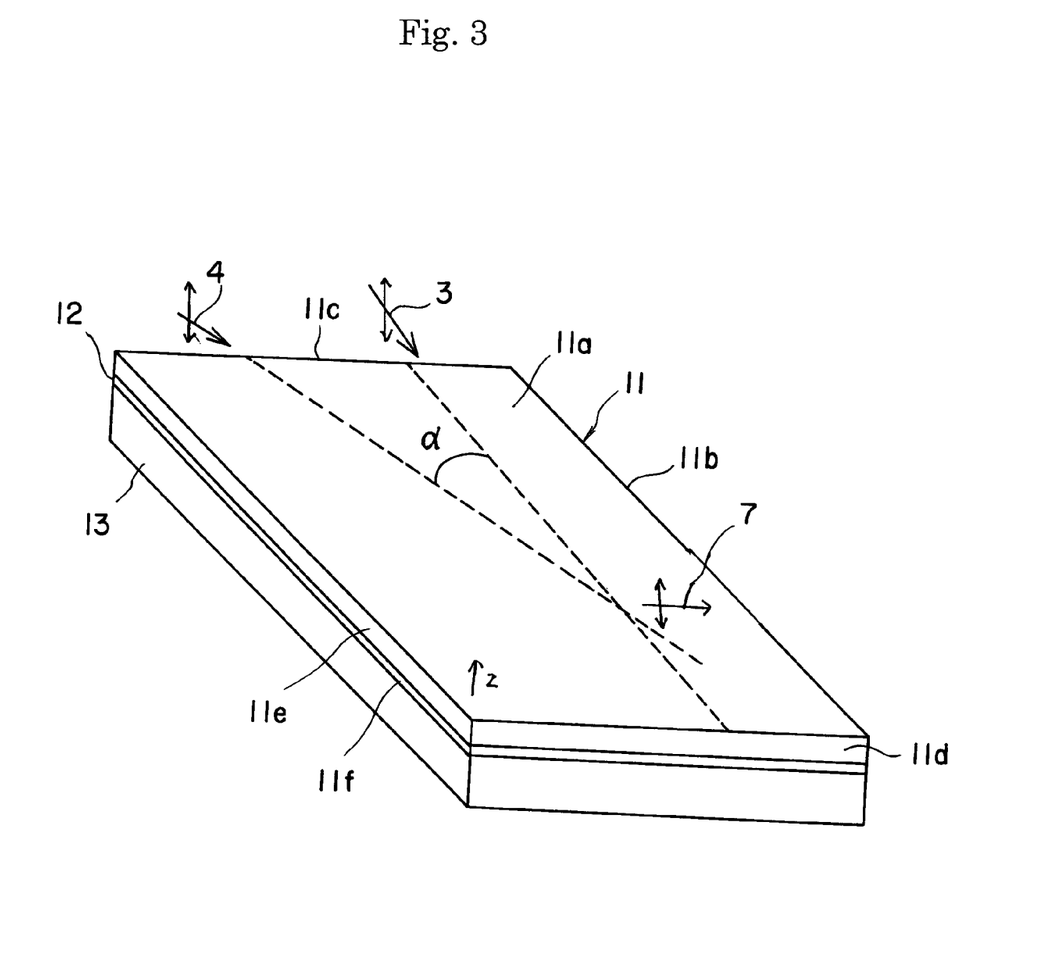
FIG. 3 is a perspective view showing an oscillating device according to an embodiment of the present invention.
Figure 4:
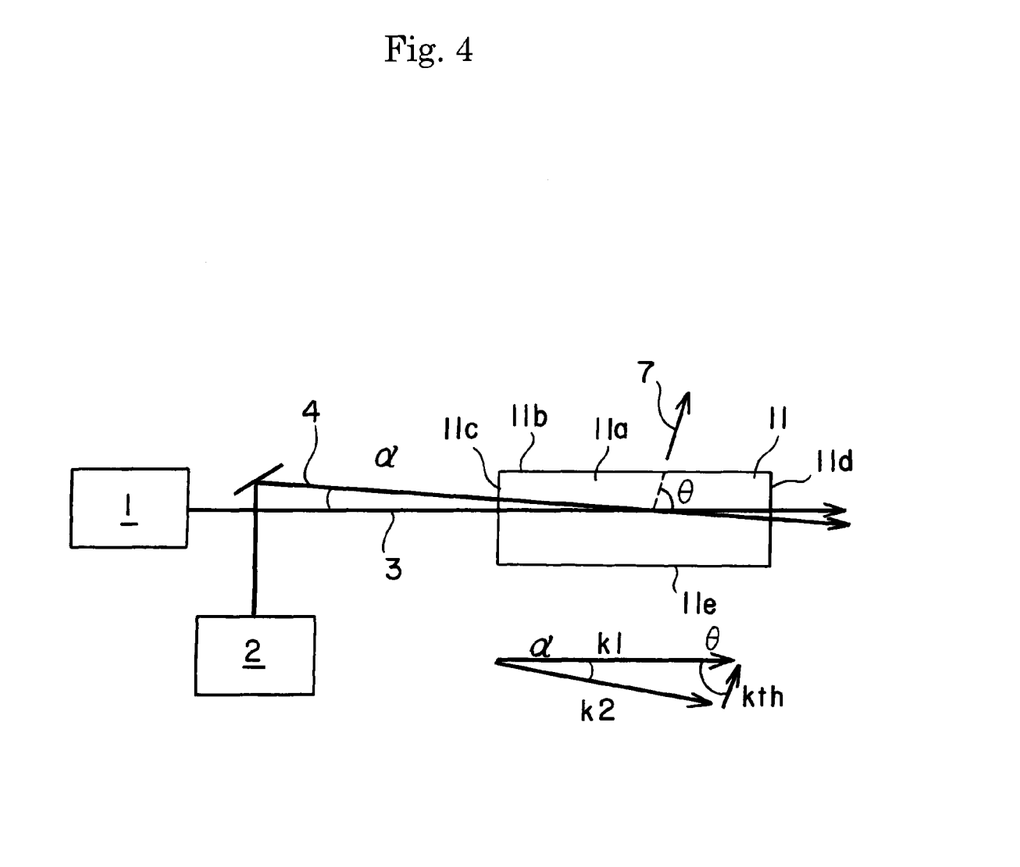
FIG. 4 is a plan view schematically showing the oscillating device of FIG. 3.
Figure 5:
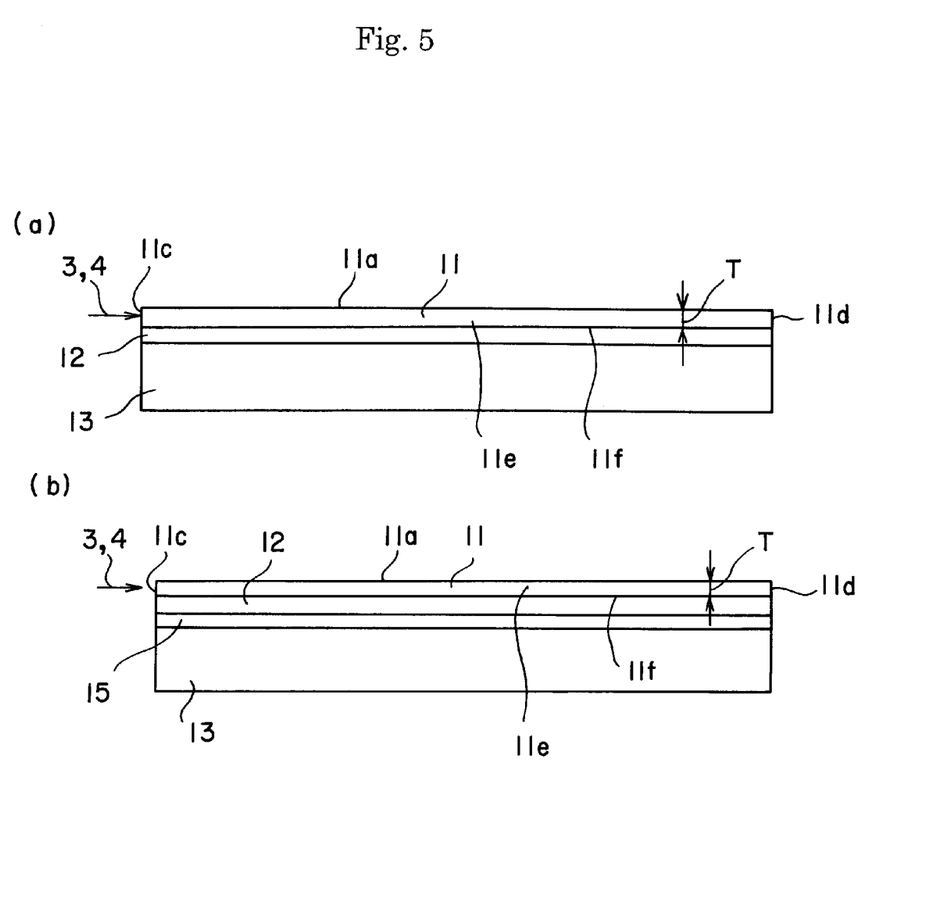

As shown in FIGS. 3, 4 and 5(a), an oscillating substrate 11 made of a non-linear optical crystal includes an incident face 11c for the pump and idler waves, an emitting face 11d, side faces 11b, 11e, an upper face 11a and a bottom face 11f. The bottom face 11f of the oscillating substrate 11 is joined with a supporting body 13 through an adhesive layer 12.

According to a device of FIG. 5(b), a film 15 for reflecting the terahertz wave is further formed on the joining face of the supporting body 13.

For example, the pump wave 3 is irradiated from a light source 1 and the idler wave 4 is irradiated from a light source 2, respectively, onto the substrate. At this stage, it is constructed that the pump wave 3 and idler wave 4 propagate in parallel with the bottom face 11f. Among the pump wave 3 (frequency ω1), idler wave (frequency ω2) and polariton (terahertz wave: frequency ωT), law of conservation of energy (ω1=ω2+ωT) and law of conservation of momentum (Noncolliner phase matching condition: k1=k2+kth) are satisfied so that polariton stimulated scattering is observed. In this case, based on the scattering property, the wavelengths of the idler wave 4 and terahertz wave 7 are decided depending on angles α and θ of the pump wave 3 with respect to the optical axis.

The terahertz wave oscillated from the overlap (interacting) part of the pump and idler waves propagates in parallel with the bottom face 11f of the substrate and at an intersecting angle θ with respect to the pump wave 3. As the thickness T of the substrate 11 is made smaller, cut-off condition is satisfied with respect to the terahertz wave 7 oscillating in parallel with the substrate bottom face 11f. Then, the terahertz wave does not propagate within the crystal and radiated to the outside of the substrate. It is thus possible to prevent the attenuation of the terahertz wave due to the propagation within the substrate and to avoid the necessity of providing a means for drawing the terahertz wave, such as a prism, grating or the like, on the crystal surface.

The non-linear optical crystal is not limited as far as it is capable of oscillating terahertz wave by parametric effect, and the crystal includes a dielectric material such as lithium niobate, lithium tantalate, solid solution of lithium niobate and lithium tantalate, KTP and KN. Further, the crystal may be doped with magnesium oxide or the like for preventing optical damage. Further, the lithium niobate may be of congruent composition as well as stoichiometric composition.

A z-plate of a non-linear optical crystal means a substrate in which the z-axis of the crystal is aligned in the direction of the normal line (direction perpendicular to) the substrate 5. In the case of a dielectric material such as lithium niobate and lithium tantalate, the non-linear optical constant d33 is the largest. The polarization direction of the inputted waves (pump and idler waves) are made the direction of z-axis to oscillate electromagnetic wave in the direction of z-axis. According to the present invention, the thickness of the substrate may be made 20 μm or smaller to form a slab type waveguide with respect to the inputted lights. It is thus possible to improve the power density by propagating the lights in TM mode in the waveguide and thereby to generate the terahertz wave at a high efficiency.

The frequencies of the pump, idler and terahertz waves, α and θ are decided by the parametric oscillating condition. Typically, the wavelength of the pump wave may preferably be 800 nm to 1600 nm, and α may preferably be 0.04° to 4°. In this case, θ is in a range of 65 to 62°

Figure 7:
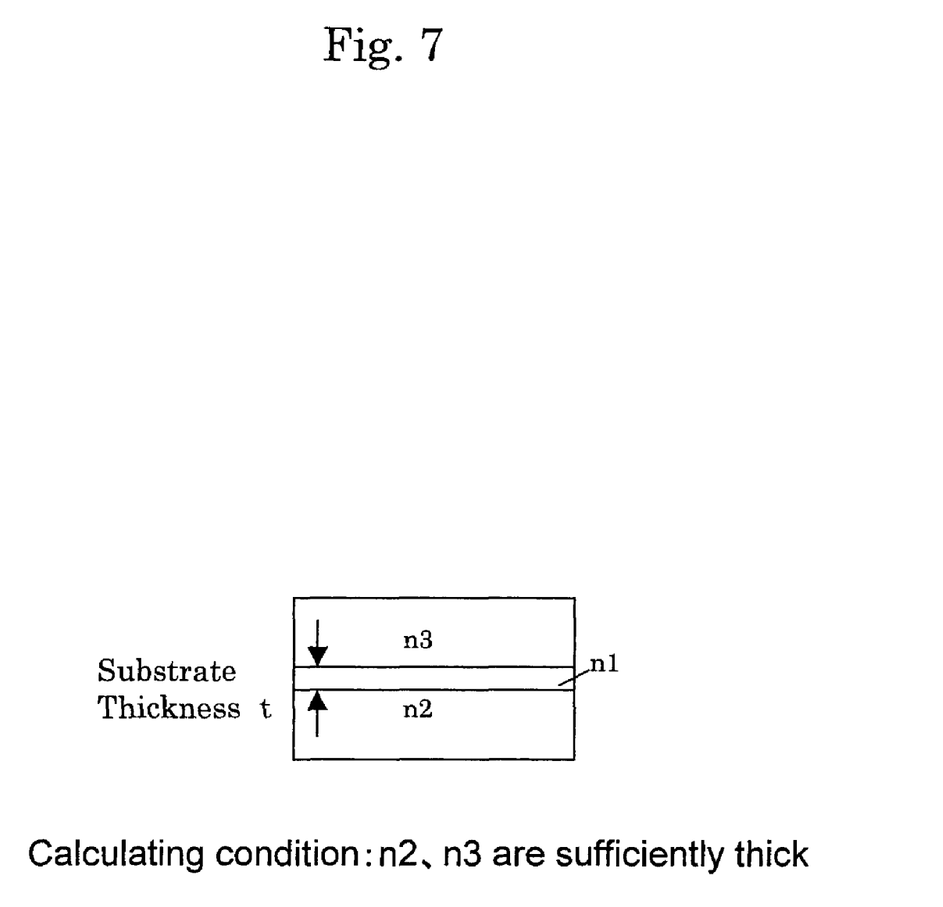
FIG. 7 is a schematic view showing a calculating model of structure of refractive index.

According to a structure of indices shown in FIG. 7 (n1 represents a refractive index of a core, and n2 and n3 represent refractive indices of a clad), in the case of TM mode propagation applied in the present invention, the thickness Tc required for cut-off condition is represented by the following formula (m represents mode order).

$$Tc = \frac{\lambda_{THz}}{2\pi\sqrt{n_1^2 - n_2^2}} \cdot \left[\tan^{-1}\left(\frac{n_1^2}{n_3^2}\sqrt{\frac{n_2^2 - n_3^2}{n_1^2 - n_2^2}} + m\pi\right)\right]$$

When the oscillating substrate is made of lithium niobate, for example, the substrate thickness Tc for satisfying the cut-off condition becomes 144 to 4.8 μm for the frequency range of 0.1 THz to 3 THz.

According to the structure of the invention, the pump wave as exciting light source and idler wave can be propagated in the slab waveguide for generating the terahertz wave at a high efficiency. On the viewpoint, the thickness of the oscillating substrate may preferably be 20 μm or smaller. Most preferably, the thickness may be 4 μm or larger and 15 μm or smaller for connecting the exciting light source to the oscillating substrate efficiently and for propagating it at a still lower loss.

Figure 6:
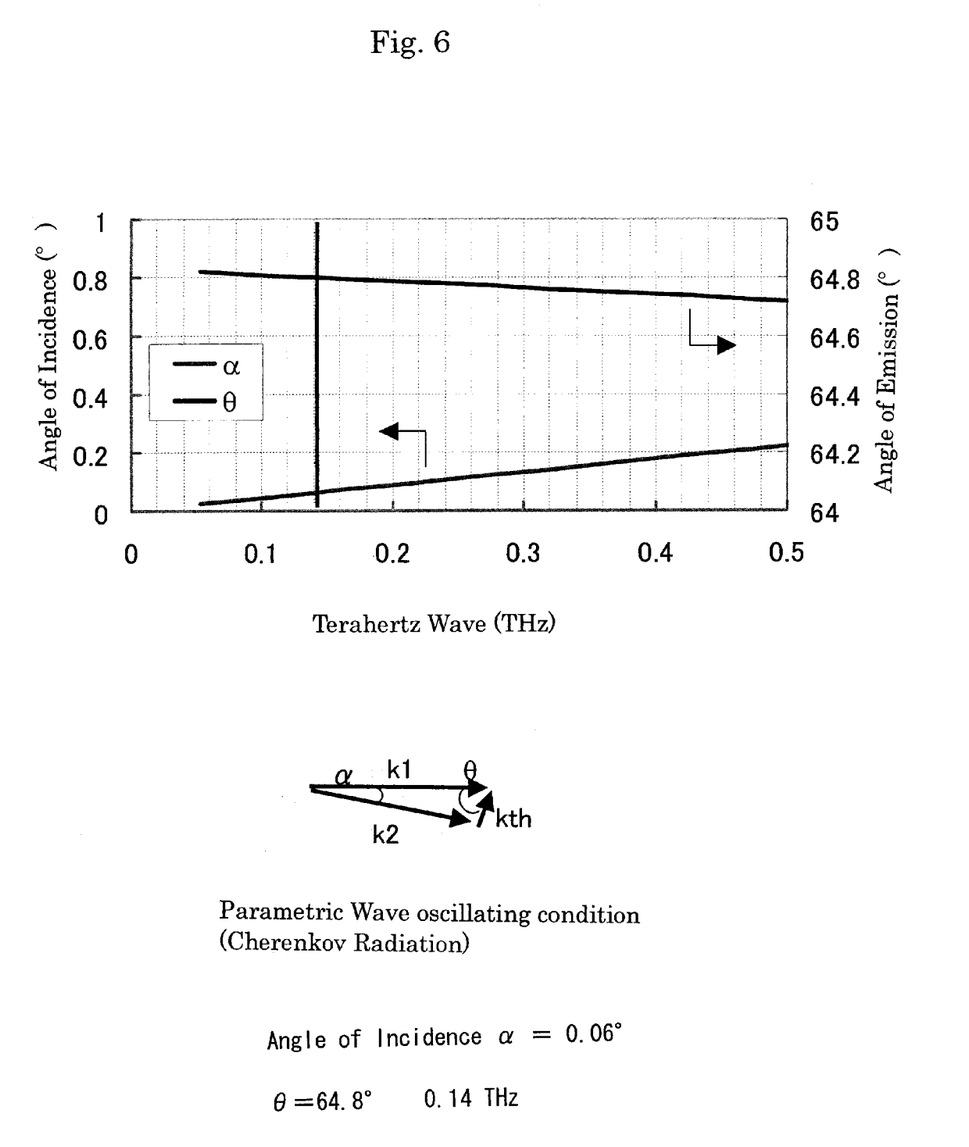
FIG. 6 is a graph showing the relationship of the frequency of terahertz wave, an incident angle α and an emitting angle θ.

FIG. 6 shows the relationship of the frequency of the terahertz wave, incident angle α and emitting angle θ. FIG. 6 shows the results of simulation under the following condition.

According to Polariton stimulated scattering process, it is required that the laws of conservation of energy and momentum are satisfied among the pump, idler and terahertz waves, as described above. Based on this, the frequencies (wavelengths) of the idler and terahertz waves were calculated by the law of conservation of energy, provided that the wavelength of the pump wave is 1064 nm. Further, the refractive indices for the respective wavelengths are calculated by Sellmeier equation and the angle α of incidence and angle θ of emission were calculated by the law of conservation of momentum.

As can be seen from the results, in a range of terahertz wave, particularly in a range of 0.5 THz or lower, the incident angle α is small and a distance of the pump and idler waves becomes small.

Although the material of the supporting body is not particularly limited, a dielectric material such as lithium niobate, lithium tantalate, solid solution of lithium niobate and lithium tantalate, KTP and KN, a semiconductor such as GaP and ZnSe, and a glass such as quartz glass are listed.

Further, on the viewpoint of improving the reliability and matching of thermal expansion with that of the oscillating substrate, the supporting body may preferably be made of the same material as the oscillating substrate.

The adhesive adhering the oscillating substrate and supporting body is preferably made of a material having a dielectric constant lower than that of the oscillating substrate. Specifically, the refractive index of the adhesive may preferably be 2 or lower. Although the specific examples of the adhesive are not particularly limited, an epoxy series resin adhesive, an acrylic resin series adhesive, a Cardo polymer series resin adhesive, a room-temperature curable resin adhesive, a thermosetting type resin adhesive, an ultraviolet curable type resin adhesive and Alon Ceramics C (Trade Name, supplied by To a Gosei Co. LTD.) (thermal expansion coefficient of $13 \times 10^{-6}$/K) may be listed.

Although the thickness of the adhesive layer is not particularly limited, the thickness may preferably be 0.5 μm or larger on the viewpoint of preventing the leakage of the terahertz wave.

The light sources for the pump and idler waves may preferably be a semiconductor laser or a solid laser excited by the semiconductor laser (YAG, $YVO_4$, YLF or the like). Such semiconductor laser or solid laser light source may be connected to the crystal with a butt joint or a lens. Further, the light source may be guided with an optical fiber whose end face may be connected with the crystal with a butt joint or a lens.

According to the present invention, the refractive index of the adhesive layer with respect to the pump wave is lower than that of the oscillating substrate with respect to the pump wave. The difference of the both may preferably be 0.05 or lager and more preferably be 0.1 or larger.

Further, the refractive index of the adhesive layer for the pump wave may preferably be 2 or lower. The refractive index of the adhesive layer for the pump wave may be 1.3 or higher in a practical point of view and more preferably be 1.4 or higher.

The refractive index of the oscillating substrate for the pump wave may preferably be 2 or higher. Further, the refractive index of the oscillating substrate for the pump wave may preferably be 4 or lower.

The following advantageous effects are obtained by providing the film 15 reflecting the electromagnetic wave on the joining surface on the side of the adhesive layer of the supporting body, as exemplified in FIG. 5(b).

That is, an electrode in not provided on the surface of the oscillating substrate, which provides cut-off state with respect to the generated electromagnetic wave having a wavelength of 0.1 THz to 3 THz. The oscillated electromagnetic wave is thus emitted to the directions of the surface and back face (toward the supporting body) is radiation mode, so that the wave does not reach the side faces of the oscillating substrate.

It is then proved to be difficult to emit the oscillated electromagnetic wave to the direction of the substrate surface efficiently, since the oscillated electromagnetic wave is scattered without a specific directivity. That is, the terahertz wave having a wavelength of 0.1 THz to 3 THz has a high absorbance by various materials, so that the electromagnetic wave irradiated toward the back face of the oscillating substrate is absorbed by the supporting body and is not emitted to the outside of the device. For example, in the case that the supporting body 13 is made of lithium niobate single crystal, most of the oscillated electromagnetic wave is absorbed by the supporting body having a thickness of as small as about 100 μm. As a result, a considerable portion of the generated electromagnetic wave (about a half) is not emitted to the outside of the device.

Here, it is found that the electromagnetic wave irradiated in the direction of the back face of the oscillating substrate can be emitted to the outside of the device and the output power can be made two times or more, by forming the film reflecting the electromagnetic wave on the surface of the supporting body on the side of the adhesive layer.

Besides, if an optical modulator would be operated for the modulation on a frequency band of 0.1 THz to 3 THz, the electromagnetic wave should have been propagated in a supporting body in substrate radiation mode. However, the electromagnetic wave should have been absorbed and disappears so that it is not necessary to provide a film reflecting the electromagnetic wave on the surface of the supporting body.

According to the present embodiment, the film reflecting the electromagnetic wave refers to a film for (1) preventing the incidence of the electromagnetic wave into the supporting body (Shielding of electromagnetic wave) and (2) irradiating the electromagnetic wave to the side of the oscillating substrate surface (irradiation of electromagnetic wave). The reflectivity of the film reflecting the electromagnetic wave in the air may preferably be 80 percent or higher. The upper limit of the reflectivity is not particularly limited and may be 100 percent.

The reflectivity in the terahertz band is generally measured by a Fourier Transform Infrared Spectroscopy system (for example, Brucker IFS66v/S).

The material of the film reflecting the electromagnetic wave includes a metal and a semiconductor, and may preferably be a noble metal such as gold, silver or copper. The thickness of the film reflecting the electromagnetic wave may preferably be three times or larger of the skin depth of the generated electromagnetic wave. For example, in the case that the film is made of gold and the electromagnetic wave has frequency of 0.2 THz, the conductivity of gold is $44.4 \times 10^6$/Ω·cm and the skin depth is 0.17 μm. Therefore, the thickness of the reflective film may preferably be 0.51 μm or more. Although the upper limit of the thickness of the film reflecting the electromagnetic wave is not limited, the upper limit may preferably be 3 μm on the viewpoint of availability of thin film formation by vapor deposition, sputtering or the like.

EXAMPLES

Inventive Example 1

The terahertz wave oscillating device described referring to FIGS. 3, 4 and 5(a) was produced.

Specifically, a z-plate of lithium niobate single crystal doped with MgO was used as the oscillating substrate 11 and a z-plate of non-doped lithium niobate single crystal was used as the supporting body 13. The oscillating substrate has a refractive index of 2.14 with respect to the pump wave (wavelength of 1064 nm). An adhesive layer was applied onto the joining face of the supporting body in a thickness of 1 μm or smaller to adhere the z-plate of MgO-doped lithium niobate thereon. The adhesive layer used was made of a Cardo polymer and had a refractive index of 1.9 in a wavelength band of 1 μm. Then, the z-plate of MgO-doped lithium niobate was thinned by precise polishing to a thickness of 5 μm to form the oscillating substrate 11. Thereafter, the joined body was cut with a dicer to chips each having a length of 5 mm to produce the device shown in FIGS. 3, 4 and 5(a).

The pump wave 3 (wavelength of 1064 nm, power of 100 mW) and idler wave 4 (wavelength 1064.8 nm, power of 100 mW) were irradiated onto the thus produced device at an angle (incident angle α) of 0.094°. The both waves propagated within the oscillating substrate 11 in slab mode and the electromagnetic wave 7 of 0.2 THz and 1 mW was successfully detected in a direction of an angle θ of 64.8° with respect to the pump wave 3.

Here, when the waves were propagated as shown in FIGS. 3 and 4, the thickness of the oscillating substrate providing cut-off condition for the oscillated electromagnetic wave of 0.2 THz was 15.8 μm.

Similarly, the above described device was used and the wavelength of the idler wave was changed while the angle α of incidence was made as shown in FIG. 6. As a result, the electromagnetic wave 7 with a frequency to 0.5 THz was oscillated in a direction of an emitting angle θ to observe the generation of the electromagnetic wave with a frequency up to 3 THz. In the case that the wavelength of the electromagnetic wave is 3 THz, the wavelength, angle α of incidence and angle θ of emission of the idler wave 4 were 1075.6 nm, 1.34° and 64.1°, respectively. As described above, it was proved that the device enables the wide-band oscillation of the terahertz wave.

Inventive Example 2

The device described referring to FIGS. 3, 4 and 5(b) was produced, according to the same procedure described the Inventive Example 1. According to the present example, however, the film reflecting the electromagnetic wave was formed on the surface of the supporting body 13, before the supporting body 13 was adhered to the oscillating substrate 11. The adhesive layer was same as that described in the Inventive Example 1.

That is, on the joining surface of the supporting body of the z-plate of non-doped lithium niobate single crystal, titanium, platinum and gold were formed by vapor deposition in thicknesses of 100 angstrom, 200 angstrom and 1 μm, respectively. Then, platinum and titanium were formed in thicknesses of 200 and 100 angstrom, respectively, for further improving the adhesive strength to form the reflective film 15. The reflectivity of the thus formed refractive film was measured by a Fourier Transform Infrared Spectroscopy system (for example, Brucker IFS66v/S) to be more than 90 percent in the terahertz band.

The device was used to generate the terahertz wave according to the same procedure as the Inventive Example 1, and the wavelengths of the pump and idler waves, the angles of incidence and emitting waves were the same as those in the Inventive Example 1. The terahertz wave of 0.2 THz could be detected in an output power of 2.5 mW in the direction of an angle θ of 64.8° with respect to the pump wave 3. It is considered that the electromagnetic wave in cut-off state in the oscillating substrate radiated toward the supporting body 13 is absorbed in the supporting body and attenuated in the Inventive Example 1 and radiated toward the device surface side due to the function of the reflective film of gold in the present example.

Comparative Example 1

The device described referring to FIGS. 3, 4 and 5(a) was produced, according to the same procedure described the Inventive Example 1. However, the thickness of the oscillating substrate 11 was made 100 μm.

The pump wave 3 (wavelength of 1064 nm, power of 100 mW) and idler wave 4 (wavelength 1064.8 nm, power of 100 mW) were irradiated onto the thus produced device at an angle (incident angle α) of 0.094°. The both waves propagated within the oscillating substrate 11 in slab mode and the electromagnetic wave 7 of 0.2 THz was successfully detected in a direction of an angle θ of 64.8° with respect to the pump wave 3. However, the detected output power of the electromagnetic wave 7 was as low as about 10 μW.

Similarly, the above described device was used and the wavelength of the idler wave 4 was changed while the angle α of incidence was made as shown in FIG. 6. As a result, the electromagnetic wave 7 to 0.5 THz was oscillated in a direction of an emitting angle θ to observe the generation of the electromagnetic wave with a frequency up to 3 THz. In the case that the wavelength of the electromagnetic wave was 3 THz, the wavelength, angle α of incidence, and angle θ of emission of the idler wave were 1075.6 nm, 1.34° and 64.1°, respectively. However, the output power was 1/100 or lower of that in the Inventive Example 1 in any cases.

Comparative Example 2

The device described referring to FIGS. 3, 4 and 5(a) was produced, according to the same procedure described the Inventive Example 1. However, the thickness of the oscillating substrate 11 was made 25 μm.

The pump wave 3 (wavelength of 1064 nm, power of 100 mW) and idler wave 4 (wavelength 1064.8 nm, power of 100 mW) were irradiated onto the thus produced device at an angle (incident angle α) of 0.094°. The both waves propagated within the oscillating substrate 11 in slab mode and the electromagnetic wave 7 of 0.2 THz was successfully detected in a direction of an angle θ of 64.8° with respect to the pump wave 3. However, the detected output power of the electromagnetic wave 7 was as low as about 100 μW.

Similarly, the above described device was used and the wavelength of the idler wave 4 was changed while the angle α of incidence was made as shown in FIG. 6. As a result, the electromagnetic wave 7 to 0.5 THz was oscillated in a direction of an emitting angle θ to observe the generation of the electromagnetic wave with a frequency up to 3 THz. In the case that the wavelength of the electromagnetic wave was 3 THz, the wavelength, angle α of incidence and angle θ of emission of the idler wave 4 were 1075.6 nm, 1.34° and 64.1°, respectively. However, the output power was 1/10 or lower of that in the Inventive Example 1 in any cases.

Description of Reference Numerals

3 Pump wave,
4 Idler wave,
7 Terahertz wave,
11 Oscillating substrate,
11a Upper face of oscillating substrate,
11c Incident face of oscillating substrate,
11f Bottom face of oscillating substrate,
12 Adhesive layer,
13 Supporting substrate,
15 Film reflecting electromagnetic wave,
α Angle of incidence, Although the present invention has been described with reference to particular embodiments, the invention is not limited thereto and various changes and modification may be made without departing from the scope of the appended claims.

The invention claimed is:

1. A device of oscillating an electromagnetic wave having a frequency of 0.1 THz to 3 THz from pump and idler waves by parametric effect, the device comprising:
   a supporting body:
   an oscillating substrate comprising a z-plate of a non-linear optical crystal, said oscillating substrate comprising an upper face, a bottom face and an incident face on which said pump wave is made incident; and
   an adhesive layer adhering said supporting body and said oscillating substrate,
   wherein said adhesive layer has a refractive index with respect to said pump wave lower than that of said oscillating substrate; and wherein said oscillating substrate provides cut-off with respect to said electromagnetic wave oscillated by parametric effect when said pump and idler waves propagate in parallel with said bottom face.

2. The device of claim 1, wherein said oscillating substrate has a thickness of 20 μm or smaller.

3. The device of claim 1, wherein said non-linear optical crystal is selected from the group consisting of lithium niobate, lithium tantalate and solid solution of lithium niobate and lithium tantalate.

4. The device of claim 1, wherein said adhesive layer has a refractive index of 2 or lower with respect to said pump wave and a refractive index of 5 or lower with respect to said electromagnetic wave.

5. The device of claim 1, further comprising a film reflecting said electromagnetic wave on a surface of the supporting body on the side of said adhesive layer.

* * * * *